Patented Aug. 30, 1938

2,128,255

UNITED STATES PATENT OFFICE 2,128,255

AZO DYESTUFFS

Hans Krzikalla and Hanns Ufer, Ludwigshafen-on-the-Rhine, and Bernd Eistert, Mannheim, and Gustav Klaproth, Ludwigshafen-on-the-Rhine, Germany, assignors to General Aniline Works, Inc., New York, N. Y., a corporation of Delaware No Drawing. Application December 18, 1935, Serial No. 55,040. In Germany December 22, 1934

8 Claims. (Cl. 260—92)

The present invention relates to the production of new azo dyestuffs.

We have found that new valuable azo dyestuffs are obtained if the coupling components and the diazo compounds employed in the preparation of the new dyestuffs are so chosen that the molecule of the dyestuff contains at least one sulphonic acid group and at least one basic group of the general formula:

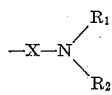

in which $R_1$ and $R_2$ may be identical or different and may be hydrogen or alkyl, cycloalkyl, hydroxyalkyl or aralkyl radicles or members of a saturated ring system and X is an aliphatic radicle combined with an aromatic nucleus of the dyestuff molecule either directly or by means of a non-basic bridge. As non-basic bridges may be mentioned for example —O—, —S—, —CO—, —SO$_2$—, —O—CO—, —NH—CO—, —SO$_2$—NH— and —CO—NH—.

Dyestuffs of the said kind may also be prepared by introducing at least one basic group of the said general formula into a dyestuff which does not yet contain such a basic group combined in the manner described above.

Thus for example a diazotizable amine having the formula:

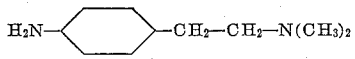

may be prepared by converting para-nitrophenyl-ethyl alcohol by means of thionyl chloride into para-nitro-omega-chlorethyl-benzene, reacting the latter with dimethylamine and reducing the nitro group in the resulting amine.

An amine having the formula:

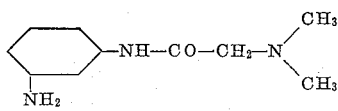

is obtainable for example by the reaction of meta-nitroaniline with chloracetyl chloride, treatment of the resulting chloracetyl-meta-nitro-anilide with dimethylamine and subsequent reduction of the nitro group.

By the reaction of meta-nitro-omega-chlor-acetophenone with ethylamine and subsequent reduction of the nitro group, an amine is obtained having the formula:

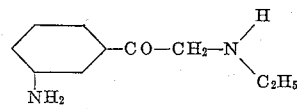

From 1-brom-2-(diethylamino)-ethane and para-acetaminothiophenol, a sulphide is obtained having the formula:

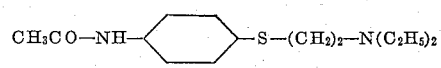

which may be saponified as such to form the amine or may first be oxidized to form the sulphone having the formula:

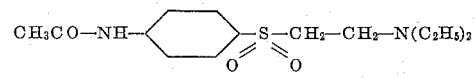

and then saponified.

The amines prepared according to the above methods or by other known methods and having external basic groups are capable of diazotization in the same way as ordinary aromatic amines and yield azo dyestuffs of the said kind by coupling with compounds which are capable of coupling.

Coupling components having external basic groups are obtained for example by reacting 2-amino-8-hydroxynaphthalene-6-sulphonic acid with chloracetyl chloride or a chlorpropionic acid chloride and treating the resulting 2-(chloracyl-amino)-8-hydroxynaphthalene-6-sulphonic acid with piperidine, dimethylamine or other nitrogen bases which have at least one reactive hydrogen atom. By reacting 2-acetoxy-3-naphthoic acid chloride with N-diethyl-ethylene-diamine and then splitting off the acetyl group, a naphthol is obtained having the formula:

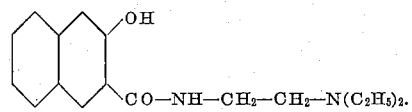

Further suitable coupling components are for example the pyrazolones prepared from the above amines by the usual methods, and also the aceto-acetyl or benzoyl-acetyl and 2-hydroxy-3-naphthoyl compounds of the said amines. These coupling components may be coupled with any desired diazotized aromatic amines to yield dyestuffs of the said kind.

If the coupling component employed contains an amino group, the monoazo dyestuff prepared may be diazotized and the diazo compound be coupled with any desired coupling component. Diazo dyestuffs are thus obtained with excellent properties as regards levelling power and fastness.

The introduction of the external basic radicle of the general formula

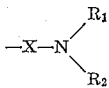

in which X stands for an aliphatic radical into aminoazo or hydroxyazo dyestuffs is effected in a similar manner.

The azo dyestuffs obtainable according to this invention and having external basic groups are distinguished by an excellent levelling power and for the most part by good to very good fastness to washing and fulling. When the dyestuffs contain groups which are capable of being exchanged by metals, they may be converted in substance or on the fibre into their complex metal compounds.

The following examples will further illustrate how the said invention may be carried out in practice but the invention is not restricted to these examples. The parts are by weight.

*Example 1*

270 parts of 4-methyl-3-amino-phenyl-1-omega-(diethyl-amino)-ethyl sulphone having the formula:

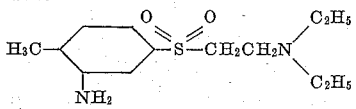

are dissolved in a mixture of 1000 parts of water and 350 parts of concentrated hydrochloric acid and diazotized with a solution 69 parts of sodium nitrite at from 0° to 5° C. The diazo solution is then stirred into a solution of 463 parts of 1-(4'-sulphophenyl)-3-methyl-5-pyrazolone, 210 parts of an about 28 per cent caustic soda solution and 270 parts of calcined soda in 2000 parts of water. When the coupling is completed, the resulting dyestuff is precipitated with a common salt solution. It dyes wool yellow shades which are very uniform and of good fastness to washing.

A similar procedure is followed when employing the coupling components given in the following table instead of 1-(4'-sulpho-phenyl)-3-methyl-5-pyrazolone:

| Coupling component | Color of dyeing on wool |
| --- | --- |
| 1-(3'-chlor-5'-sulphophenyl)-3-methyl-5-pyrazolone | Yellow. |
| 2-hydroxynaphthalene-6-sulphonic acid | Orange. |
| 2-hydroxynaphthalene-8-sulphonic acid | Do. |
| 2-hydroxynaphthalene-3,6-disulphonic acid | Red. |
| 2-hydroxynaphthalene-6,8-disulphonic acid | Orange. |
| 1-benzoylamino-8-hydroxynaphthalene-4,6-disulphonic acid. | Bluish red. |
| 2-amino-8-hydroxynaphthalene-3,6-disulphonic acid | Brown. |

The dyestuffs are also suitable for example for dyeing wool, silk and leather.

Similar dyestuffs are obtained for example by employing para-aminophenyl-omega-(ethylamino)-ethyl sulphone instead of the said diazo component.

Dyestuffs of somewhat bluer shades but of similar properties are obtained with diazotized meta- or para-amino-omega-(dimethylamino)-phenetol, meta- or para-amino-omega-(diethylamino)-phenetol, para-amino-benzyl-dimethylamine or para-amino-benzyl-diethylamine. The fastness to washing of the dyestuffs may be further improved by introducing the radicle of dibutyl, dihexyl, dicyclohexyl or dodecyl amine or the piperidino group instead of the diethyl or dimethylamino radicle, the levelling power of the dyestuffs being the same.

*Example 2*

A diazo solution prepared from 270 parts of 4-methyl-3-aminophenyl-1-omega-(diethylamino)-ethyl sulphone in the manner described in Example 1 is stirred into a solution of 571 parts of 1-(2'-hydroxy-3'-carboxy-5'-sulphophenyl)-3-methyl-5-pyrazolone, 300 parts of an about 28 per cent caustic soda solution and 270 parts of calcined soda in 2500 parts of water. The dyestuff precipitated by acidification dyes wool very uniform yellow shades which are fast to washing and fulling; it may be treated in substance or on the fibre with agents supplying chromium and then yields redder shades of colour.

*Example 3*

107 parts of para-toluidine are diazotized in the usual manner and the diazo solution is stirred into a solution, rendered alkaline with sodium carbonate, of 340 parts of 2-(dimethyl-aminoacetyl)-amino-8-hydroxynaphthalene-6-sulphonic acid having the formula

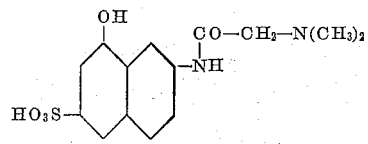

and the mixture worked up in the usual manner. The dyestuff obtained dyes wool uniform carmine-red shades of good fastness to washing.

By starting from the following diazotized compounds dyestuffs having a good levelling power and good fastness to washing are obtained, giving the following colour shades

| | |
| --- | --- |
| Sulphanilic acid | Red. |
| Aminoazobenzene sulphonic acid | Bordeaux red. |
| 1-methyl-3-amino-6-chlorbenzene-4-sulphonic acid | Brown-red. |
| 1-aminonaphthalene-2-sulphonic acid | Blue-red. |

If, instead of the 2-(dimethylaminoacetyl)-amino-8-hydroxy-naphthalene-6-sulphonic acid the corresponding 3,6-disulphonic acid be employed, dyestuffs of similar shades and properties are obtained. By employing 1-(dimethylaminoacetyl)-amino-8-hydroxynaphthalene-3,6-disulphonic acid, yellower dyestuffs are in general obtained.

*Example 4*

Diazotized para-toluidine is coupled in the usual manner with 1-amino-2-methoxynaphthalene-6-sulphonic acid in a solution rendered alkaline with sodium carbonate. 371 parts of the pure dyestuff (or a corresponding amount of the crude dyestuff) are treated in a solution, rendered alkaline with sodium carbonate, with 130 parts of chloracetyl chloride added a little at a time. The whole is stirred until the chloracetyl chloride has disappeared and the chloracetyl compound of the dyestuff is precipitated with acid. It is filtered off by suction and heated with 300 parts of a 30 per cent solution of dimethylamine until the reaction is completed. A dyestuff is obtained which dyes wool very uniform red shades which are fast to washing.

Example 5

35 parts of para-nitraniline are diazotized and coupled, in an acid medium, with 91 parts of 1-amino-8-hydroxynaphthalene-3,6-disulphonic acid. The whole is then rendered alkaline by means of sodium carbonate and the diazo solution from 52 parts of meta-amino-omega-diethylaminophenetol is added thereto. The blue dyestuff obtained dyes wool even shades which are fast to washing.

Dyestuffs having similar properties are obtained by employing, instead of paranitraniline, ortho-nitraniline, para-nitro-ortho-anisidine, p-chloraniline, 2,5-dichloro-4-nitraniline, or instead of meta-amino-omega-diethylamino-phenetol the corresponding para-compound, or the p-aminobenzyl-diethyl amine, or the 4-methyl-3-aminophenyl-1-omega-(diethylamino)-ethyl sulphone described in Example 1, or the 4-methoxy-3-aminophenyl-1-omega-(dimethylamino)-ethyl sulphone. Stronger dyeings of the blue dyestuffs obtained yield good, fast and even black shades.

Example 6

1 molecular proportion of diazotized aniline is coupled in the usual manner with 1 molecular proportion of the symmetric condensation product obtained by reacting 1 molecular proportion of phosgene with 2 molecular proportions of 2-amino-5-hydroxynaphthalene-7-sulphonic acid. The mono-azo dyestuff obtained is dissolved in sodium carbonate solution and the diazo solution from 1 molecular proportion of 4-methyl-3-aminophenyl-1-(omega-diethylamino)-ethylsulphone is added thereto. A good substantive dyestuff is thus obtained which dyes cotton scarlet-red shades. This dyestuff may also be employed for dyeing viscose artificial silk. Similar dyestuffs which in part have bluer shades are obtained by employing, instead of the said sulphone, one of the diazotizable amines described in Example 1.

Example 7

A diazo solution prepared according to Example 1 from 270 parts of 4-methyl-3-amino-phenyl-1-omega-(diethylamino)-ethyl sulphone is introduced, while stirring, into a solution of 241 parts of 1-amino-2-methoxynaphthalene-6-sulphonic acid in sodium carbonate solution. The dyestuff obtained dyes wool very even blue-red shades having a good fastness to washing. By acetylating, a dyestuff is obtained which dyes wool yellower shades which have the same levelling power but are even faster to fulling. Excellent dyeings are likewise obtained by introducing into the dyestuff the radicle of dimethylaminoacetic acid in the manner described in Example 4.

Example 8

230 parts of 4-hydroxy-3-amino-1-(omega-diethylamino)-ethyl sulphone are diazotized in the presence of 350 parts of concentrated hydrochloric acid and 2000 parts of water with 69 parts of sodium nitrite. The diazo solution is added to 250 parts of the sodium salt of the 2-hydroxynaphthalene-6-sulphonic acid dissolved in sodium carbonate solution. The resulting dyestuff dyes wool orange-red shades. It may be treated, either on the fibre or in substance, with agents supplying chromium Bordeaux-red colorations being obtained. The dyeings are very uniform and fast to washing.

Example 9

388 parts of the potassium salt of 4-methyl-3-amino-phenyl-1-omega-(diethylamino)-ethyl sulphone-5-sulphonic acid are diazotized at 0.5° C. in the presence of 350 parts of concentrated hydrochloric acid and 1000 parts of water with 69 parts of sodium nitrite. The diazo solution is added, while stirring, to 192 parts of 1-phenyl-3-methyl-5-pyrazolone and 270 parts of sodium carbonate dissolved in 2000 parts of water. The precipitation of the dyestuff is completed by the addition of common salt. The azo dyestuff thus obtained dyes wool uniform yellow shades of good fastness to washing.

If, instead of 1-phenyl-3-methyl-5-pyrazolone, 2-hydroxy-naphthalene or 2-acetylamino-8-hydroxy-naphthalene-6-sulphonic acid be employed, dyestuffs of orange or red shades and similar valuable properties are obtained.

Example 10

3-(2',3'-hydroxynaphthoyl)-amino-4-methoxy-phenyl-1-omega-(diethylaminoethyl)-sulphone is prepared in known manner by treating 19 parts of 2-hydroxy-naphthalene-3-carboxylic acid with 27 parts of 3-amino-4-methoxyphenyl-1-omega-(diethyl-amino ethyl)-sulphone in the presence of phosphorus trichloride. 46 parts of the compound thus obtained are dissolved in 100 parts of methanol under addition of 6 parts of potassium hydroxide. The methyl alcoholic solution is diluted with 300 parts of water and after addition of sodium carbonate the diazo solution of 24 parts of the sodium salt of 4-aminobenzene-1-sulphonic acid is added. An azo dyestuff is thus obtained which dyes wool very uniform red shades of good fastness to washing.

Instead of the 3-(2',3'-hydroxynaphthoyl)-amino-4-methoxy-phenyl-1-omega-(diethylaminoethyl)-sulphone there may be employed the 4-(2',3'-hydroxynaphthoyl)-aminobenzyl-diethylamine as the coupling component.

Example 11

260 parts of 4-aminophenyl-1-omega-(diethylaminoethyl)-sulphone are diazotized in the presence of 350 parts of concentrated hydrochloric acid and 1000 parts of water with 69 parts of sodium nitrite. The diazo solution thus prepared is added to an aqueous solution, rendered alkaline with sodium carbonate of 430 parts of the sodium salt of 2-hydroxynaphthalene-6,8-disulphonic acid. An azo dyestuff is obtained which yields dyeings of orange shades and good fastness.

Example 12

280 parts of 3-amino-4-methoxyphenyl-1-omega-(diethylamino-ethyl)-sulphone are diazotized in the presence of 350 parts of concentrated hydrochloric acid and 1000 parts of water with 69 parts of sodium nitrite. The diazo solution thus prepared is added to an aqueous solution, rendered alkaline with 270 parts of sodium carbonate, of 240 parts of the sodium salt of 1-hydroxy-naphthalene-4-sulphonic acid. The azo dyestuff thus obtained dyes wool very uniform red shades of good fastness to washing.

If the same diazo component is employed while coupling with 1-(2'-chlor-5'-sulphophenyl)-3-methyl-5-pyrazolone or 1-(4'-sulphophenyl)-3- methyl-5-pyrazolone yellow dyestuffs are obtained, while if coupling with 1-benzoyl-amino-8-hydroxynaphthalene-4,6-disulphonic acid a blue dyestuff is obtained. These dyestuffs yield dyeings of high levelling power and good fastness to washing.

*Example 13*

370 parts of 3-amino-4-methyl-5-nitrophenyl-1-omega-(dibutyl-aminoethyl)-sulphone are diazotized in the presence of 350 parts of concentrated hydrochloric acid and 1000 parts of water with 69 parts of sodium nitrite. The diazo solution thus prepared is added to an aqueous solution, rendered alkaline with 270 parts of sodium carbonate, of 260 parts of 2-amino-8-hydroxynaphthalene-6-sulphonic acid. The dyestuff obtained dyes wool red shades of good fastness.

*Example 14*

208 parts of p-amino-omega-diethylaminophenetol are diazotized in the presence of 350 parts of concentrated hydrochloric acid and 1000 parts of water with 69 parts of sodium nitrite. The diazo solution thus obtained is added to an aqueous solution, containing such an amount of sodium hydroxide to neutralize the hydrochloric acid, of 213 parts of the sodium salt of 1-amino-naphthalene-7-sulphonic acid. The mono-azo dyestuff thus prepared is salted out, separated, dissolved again under the addition of acid and diazotized with sodium nitrite. The diazo solution thus obtained is added to an aqueous solution, containing such an amount of sodium acetate to neutralize the acid, of 289 parts of the sodium salt of 1-phenylaminonaphthalene-8-sulphonic acid. A disazo dyestuff is thus obtained which dyes wool beautiful blue shades of good fastness to washing and fulling.

Instead of para-amino-omega-diethylaminophenetol other amines containing external basic groups may be employed. As amines of this kind there may be mentioned 4-aminobenzyl-dimethyl-amine, 3 - amino - 4 - methylphenyl-1-omega - (dimethylaminoethyl) - sulphone or 3 - amino - 4 - methoxyphenyl - 1 - omega-(dimethylaminoethyl)-sulphone or the corresponding di-ethyl-compounds. Instead of 1-amino naphthalene-7-sulphonic acid there may also be employed as the first coupling component 1-aminonaphthalene-6-sulphonic acid or a mixture of these two acids. Instead of 1-phenylamino-naphthalene-8-sulphonic acid there may be employed as the second coupling component the 1-(4'-methylphenyl)-aminonaphthalene-8-sulphonic acid.

If the amine used for the preparation of the diazo component already contains a sulphonic acid group 1-amino-naphthalene may be employed as the first coupling component in this case.

*Example 15*

A diazo solution prepared in the usual manner from 159 parts of 4-aminobenzene-1-sulphonic acid is added to an aqueous solution of 338 parts of 2 - amino - 8 - hydroxynaphthyl-6-omega-(diethylaminoethyl)-sulphone and 80 parts of sodium hydroxide. The resulting dyestuff is salted out, filtered off by suction and dried. It dyes wool from an acid bath uniform red brown shades of good fastness to washing and fulling.

If the coupling process be performed in an acetic acid solution a dyestuff is obtained which dyes wool similar red brown shades of good fastness.

What we claim is:

1. Azo dyestuffs corresponding to the general formula

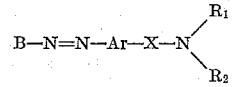

wherein Ar stands for an aromatic radical, the group

stands for a basic radical selected from the group consisting of —$NH_2$, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and B stands for the radicle of an organic compound derived from the class consisting of aromatic compound and heterocyclic nitrogen compounds, and in which at least one of the radicles marked B and Ar contains a sulphonic acid group.

2. Azo dyestuffs corresponding to the general formula

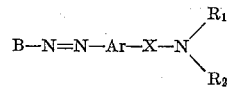

where Ar stands for an aromatic radical, the group

stands for a basic radical selected from the group consisting of —$NH_2$, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and B stands for the radicle of an aromatic compound substituted by at least one substituent selected from the amino and hydroxyl group, and in which at least one of the radicals marked B and Ar contains a sulphonic acid group.

3. Azo dyestuffs corresponding to the general formula

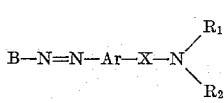

wherein Ar stands for an aromatic radical, the group

stands for a basic radical selected from the group consisting of —$NH_2$, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and B stands for a beta-naphthol sulphonic acid radicle.

4. Azo dyestuffs corresponding to the general formula

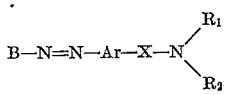

wherein the group

stands for a basic radical selected from the group consisting of —NH2, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and Ar stands for an aromatic radical of the general formula:

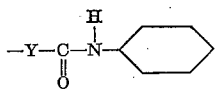

wherein Y means a radicle capable of being coupled, B stands for the radicle of an organic compound derived from the class consisting of aromatic compounds and heterocyclic nitrogen compounds and in which at least one of the radicles marked B and Ar contains a sulphonic acid group.

5. Azo dyestuffs corresponding to the general formula

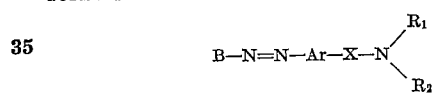

wherein the group

stands for a basic radical selected from the group consisting of —NH2, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and Ar stands for an aromatic radical of the general formula:

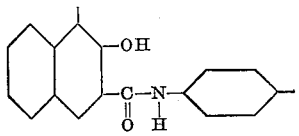

B stands for the radicle of an organic compound derived from the class consisting of aromatic compounds and heterocyclic nitrogen compounds and in which at least one of the radicles marked B and Ar contains a sulphonic acid group.

6. The azo dyestuff corresponding to the formula

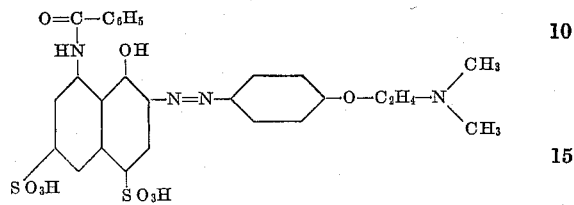

7. The azo dyestuff corresponding to the formula

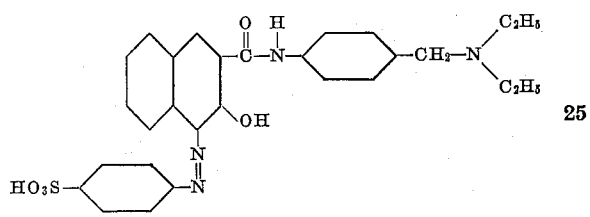

8. Azo dyestuffs corresponding to the general formula:

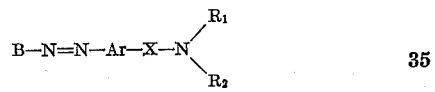

wherein Ar stands for an aromatic radical, the group

stands for a basic radical selected from the group consisting of —NH2, primary and secondary alkyl, hydroxyalkyl, aralkyl and cycloalkyl amino groups and the radicals of hydrogenated heterocyclic nitrogen compounds including the N-atom, X stands for a chain containing carbon atoms, which is free from a basic action, and B stands for an alpha-naphthol sulfonic acid radical.

HANS KRZIKALLA.
HANNS UFER.
BERND EISTERT.
GUSTAV KLAPROTH.